(12) United States Patent
Le Dinh et al.

(10) Patent No.: US 7,545,391 B2
(45) Date of Patent: Jun. 9, 2009

(54) CONTENT ADAPTIVE RESIZER

(75) Inventors: Chon Tam Le Dinh, Montreal (CA); Ngoc Lan Nguyen, Montreal (CA)

(73) Assignee: Algolith Inc., Montreal (CA)

( * ) Notice: Subject to any disclaimer, the term of this patent is extended or adjusted under 35 U.S.C. 154(b) by 347 days.

(21) Appl. No.: 11/191,911

(22) Filed: Jul. 29, 2005

(65) Prior Publication Data

US 2006/0139376 A1 Jun. 29, 2006

Related U.S. Application Data

(60) Provisional application No. 60/592,142, filed on Jul. 30, 2004.

(51) Int. Cl.
*G09G 5/00* (2006.01)
(52) U.S. Cl. .................. 345/660; 382/260; 382/300
(58) Field of Classification Search .............. 382/298, 382/199; 345/667, 698
See application file for complete search history.

(56) References Cited

U.S. PATENT DOCUMENTS

| 5,574,572 A | 11/1996 | Malinowski et al. |
| 5,661,824 A | 8/1997 | Allebach et al. |
| 5,796,879 A | 8/1998 | Wong et al. |
| 5,928,313 A * | 7/1999 | Thompson .................. 708/313 |
| 5,991,463 A * | 11/1999 | Greggain et al. ............ 382/298 |
| 6,339,434 B1 * | 1/2002 | West et al. .................. 345/667 |
| 6,724,948 B1 * | 4/2004 | Lippincott .................. 382/298 |
| 6,819,304 B2 * | 11/2004 | Branson ..................... 345/698 |
| 6,954,550 B2 * | 10/2005 | Fujieda ....................... 382/199 |
| 2003/0185463 A1 * | 10/2003 | Wredenhagen et al. ..... 382/300 |
| 2005/0122347 A1 * | 6/2005 | Buerkle et al. .............. 345/660 |

OTHER PUBLICATIONS

Li, Renxiang and Levi, Sami, "An Arbritary Resizer for MPEG Applications", IEEE Transactions on Consumer Electronics, vol. 46, Issue 3, Aug. 2000.*

* cited by examiner

*Primary Examiner*—Xiao M Wu
*Assistant Examiner*—Phi Hoang
(74) *Attorney, Agent, or Firm*—Fasken Martineau DuMoulin; Alexandre Abecassis

(57) ABSTRACT

The present description discloses a method for resizing an input image having input pixels. The method comprises segmenting the input made into region types by assigning one of the region types to each one of the input pixels; and interpolating the input image according to the region type assigned to each one of the input pixels to produce a resized image having interpolated pixels.

16 Claims, 16 Drawing Sheets

LUM PARAMETERS CALCULUS

- In a window of [5x5] pixels, read and order pixel's luma value. The rank ordered values are:

$$X_{(1)} \leq X_{(2)} \leq X_{(3)} \leq \ldots \leq X_{(23)} \leq X_{(24)} \leq X_{(25)}$$

- $\min_3 = X_{(3)}$ is the third minimum
  $\max_3 = X_{(23)}$ is the third maximum

- Compute the mean value of those rank sorted values comprising between $\min_{(3)}$ and $\max_3$:

$$\mu = (1/21) * \Sigma (X_{(i)}) \text{ where } i = 3, 4, \ldots, 23$$

- Compute the minimum mean value:

$$\mu_- = (1/N_-) * \Sigma (X_{(i)}) \text{ where } \min_3 \leq X_{(i)} \leq \mu$$

and $N_-$ = the number of $X_{(i)}$

- Compute the maximum mean value:

$$\mu_+ = (1/N_+) * \Sigma (X_{(i)}) \text{ where } \mu \leq X_{(i)} \leq \max_3$$

and $N_+$ = the number of $X_{(i)}$

Fig-7B

CONTENT ADAPTIVE RESIZER

CROSS-REFERENCE TO RELATED APPLICATIONS

This application claims priority under 35USC§119(e) of U.S. provisional patent application 60/592,142, filed Jul. 30, 2004 and entitled "Content adaptive resizer", the specification of which is hereby incorporated by reference.

TECHNICAL FIELD

The present invention relates to an image processing method and apparatus. Particularly, it relates to an apparatus and method which aims at resizing an input video image (still or moving) having a predetermined size to an output image having a different size from the input one.

BACKGROUND OF THE INVENTION

Proliferation of digital High Definition Television and of Digital Home Theater increases the demand for high quality format converters. In traditional processes, additional pixels are replicated from original ones and added to the input image to perform an up-conversion and conversely, pixels are simply dropped to perform a down-conversion. These methods are simple and easy to implement in hardware, but they introduce undesired artifacts like aliasing effects which are caused by a resampling method that does not respect the Nyquist criterion. Another approach utilizes a bilinear interpolation method to interpolate pixels. This method reduces substantially aliasing effects, but also reduces edge and texture sharpness.

In U.S. Pat. No. 5,928,313, Jul. 27, 1999, a simple FIR polyphase is proposed to resize images. This structure has some drawbacks. Since the FIR filter involved has only a predetermined set of coefficients, one cannot utilize a generic conversion ratio without introducing distortions like "horizontal and/or vertical stripes" caused by inappropriate selection of the phase coefficients. Also in U.S. Pat. No. 5,574,572, Nov. 12, 1996, a linear interpolation technique is used, where only two (2) input pixel values are weightily averaged to form the output pixel value. This results in an output image with blurred edges caused by the averaging effect.

A more elaborate method, disclosed in U.S. Pat. No. 5,661,824 Aug. 26, 1997, uses an approach based on edge map detection from which other additional pixels are generated, each having a level that does not cross boundary values set by the edge map. This approach can provide high quality scaled images with crisp edges, but it utilizes an iterative stage and thus is computationally costly for hardware implementation. In U.S. Pat. No. 5,796,879 Aug. 18, 1996, a method called area-based interpolation uses the CCD modelisation to recreate high resolution pixels. The system assimilates a pixel intensity level to the integral of a curve over a small area. The process of up sampling is equivalent to subdividing the original pixel in finer spacing pixels whose intensity levels are obtained by integrating the same curve over a smaller area. This concept can produce high-resolution-like results, but has many drawbacks for real time scaling, such as noise sensitivity and hardware cost.

In view of these considerations, it becomes important to have a scaling process that can produce artifact-free results and can remain effective to implement in hardware.

SUMMARY

The present description discloses an apparatus and method to scale an image up and/or down, based on its content, and which can be implemented in hardware.

The present description discloses a non-linear filtering method for interpolating re-sampled pixels in order to avoid aliasing and ringing distortions, a.k.a. Gibbs phenomenon, present in standard methods.

The present description discloses non-linear sharpeners to correct smeary and blurred images and thus render scaled image crisper.

The present description discloses a method and apparatus to scale up or scale down (resize) digital images based on their content. The adaptive resizing technique is based on the input image content, the use of a non-linear polyphase interpolation method and of non-linear sharpeners.

A method and apparatus for segmenting images are presented herein. The segmentation is based on four (4) directional gradient operators to yield high frequency regions and their directions. Directional compatibility tests are then conducted to identify true edges from high frequency components. The result is a map that identifies different regions (or region types) of the input image, namely edge (E), near-edge (NE), texture (T) and flat (F) regions. Also provided is a method and apparatus to scale up or scale down the input region map to the output region map. Based on the resized region map which provides an indication on the type of the pixel to be interpolated, a method of horizontal and vertical interpolation can be chosen. Thus, for edge and near-edge regions, a non-linear interpolation is conducted in order to avoid any ringing distortions. This non-linear interpolation utilizes a polyphase structure to realize the filtering operation, since this structure is convenient for hardware implementation. The non-linear filter analyses whether the interpolated value is consistent or not and assigns a valid value to the output.

The present description discloses a method and apparatus for sharpening edges and rendering texture regions crisper. For edge regions, a non-linear sharpener that detects the extremum values of a local window and, based on these extrema, computes values that tend to render edges crisper. For texture regions, another non-linear detail enhancer is used to make details stand out.

The present description discloses a method for resizing an input image having input pixels. The method comprises segmenting the input image into region types by assigning one of the region types to each one of the input pixels; and interpolating the input image according to the region type assigned to each one of the input pixels to produce a resized image having interpolated pixels.

The present description discloses an apparatus for resizing an input image having input pixels. The apparatus comprises: a segmentation unit for segmenting the input image into region types by assigning one of the region types to each one of the input pixels; and an interpolation unit comprising a filter for filtering the input pixels according to the region type assigned to each one of the input pixels to produce a resized image having interpolated pixels.

The present description discloses a method for segmenting into region types an input image having input pixels. The method comprises: identifying the region types in the input image using the input pixels; and assigning one of the region types to each one of the input pixels to thereby segment the image into the region types.

The present description discloses an apparatus for segmenting into region types an input image having input pixels. The apparatus comprises: a plurality of directional gradient operators for at least one of a) determining a frequency value for input pixels in at least one of the region types, and b) determining a direction value for input pixels in at least one of the regions, and for identifying the region types in the input image using the input pixels; and an assignment unit using at least one of the frequency value and the direction value for assigning one of the region types to each one of the input pixels to thereby segment the image into the region types.

BRIEF DESCRIPTION OF THE DRAWINGS

Further features and advantages of the present invention will become apparent from the following detailed description, taken in combination with the appended drawings, in which:

FIG. 2b is a schematic diagram which illustrates the disposition of pixels, in a 3×3 window, used in the calculation of the four derivative values;

FIG. 2c is a flowchart which describes the algorithm used in the Directional Compatibility (DC) Test 213 of FIG. 2a;

FIG. 2d is a flowchart which describes the algorithm used in the Multi-Directional (MD) Test 212 of FIG. 2a;

FIG. 7b a listing which describes the algorithm for computing parameters 710, 711, 712 and 713 delivered by the Luma Parameters Calculus module 701 as indicated in FIG. 7a;

It will be noted that throughout the appended drawings, like features are identified by like reference numerals.

DETAILED DESCRIPTION

In the present description, it should be understood that each signal outputted from a system or subsystem, represents a value at a pixel location. Sometimes, only the term "pixel" is used for convenience, but it indicates the "signal's value located at that pixel".

Figure 1:
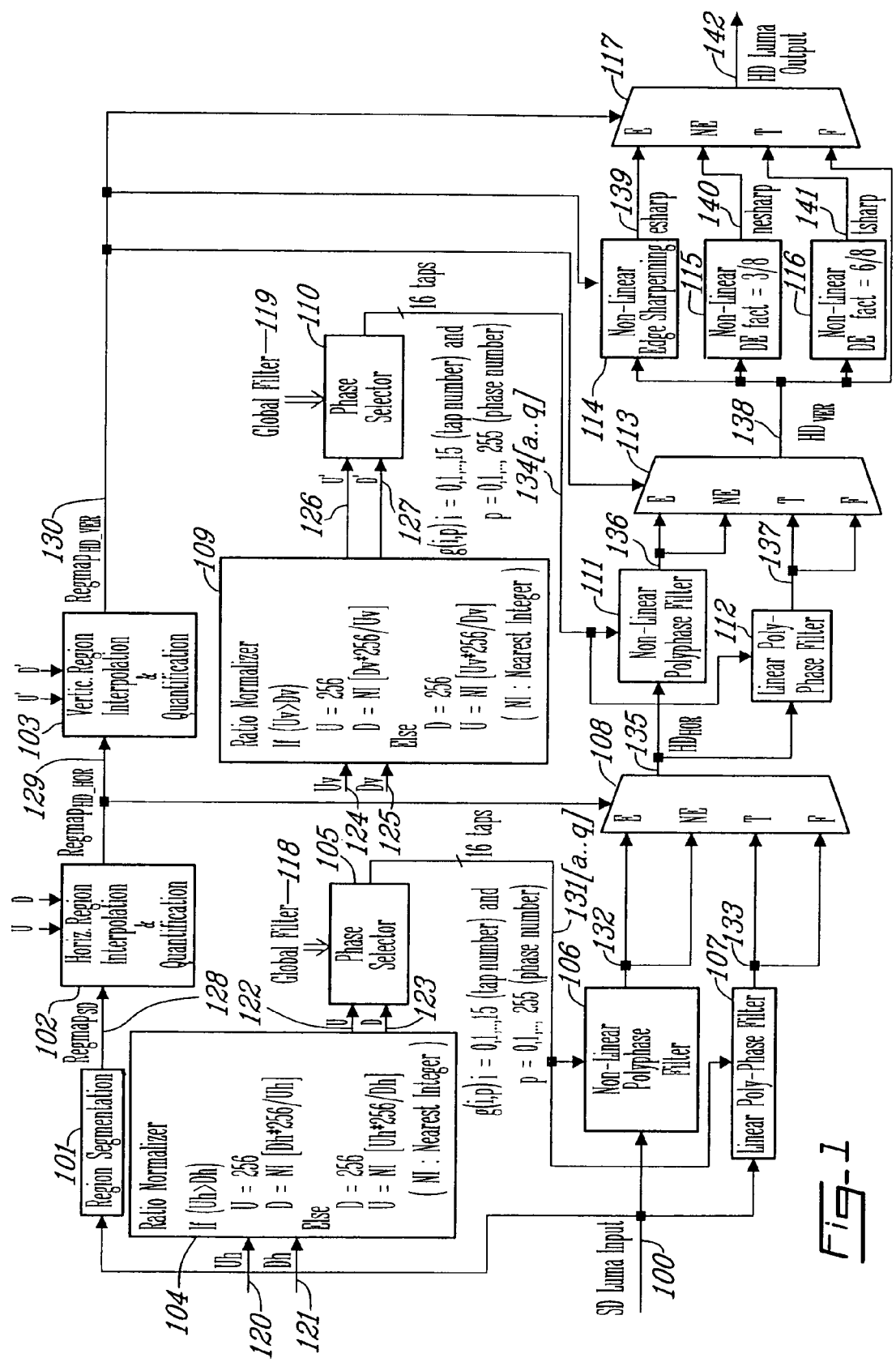
FIG. 1 is the main functional block diagram of an embodiment of an apparatus for resizing the luminance (luma) component of the input image.

FIG. 1 illustrates a global architecture of an embodiment of the apparatus, referred to as Adaptive Resizer or AResizer in the following text. Three main parts compose the present apparatus. They are:

The segmentation part which regroups devices 101, 102 and 103, allows the classification of each pixel of the processed image into one of the following categories: Edge, Near-Edge, Texture and Flat regions;

The interpolation part, comprising of a Horizontal Interpolation module which includes devices 104, 105, 106 and 107 and of a Vertical Interpolation module which includes devices 109, 110, 111 and 112; and, finally, The enhancement part which aims at rendering the edge sharpness level and texture details more visible and lively. This part regroups modules 114, 115 and 116.

Figure 2A:
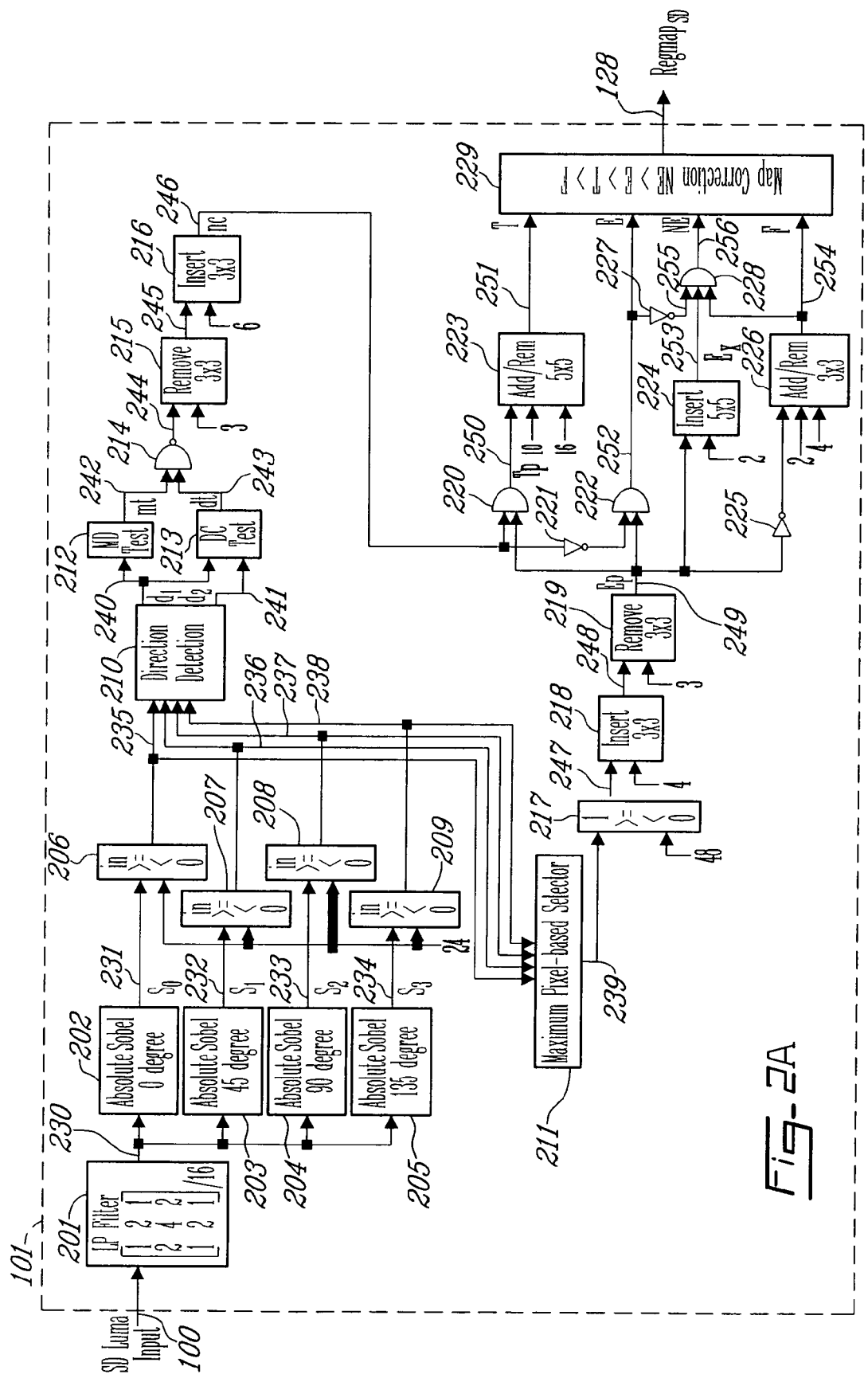
FIG. 2a is a block diagram which shows the method and apparatus used to segment the input image and is referred with number 101 in FIG. 1.
Figures 2B, 2C:
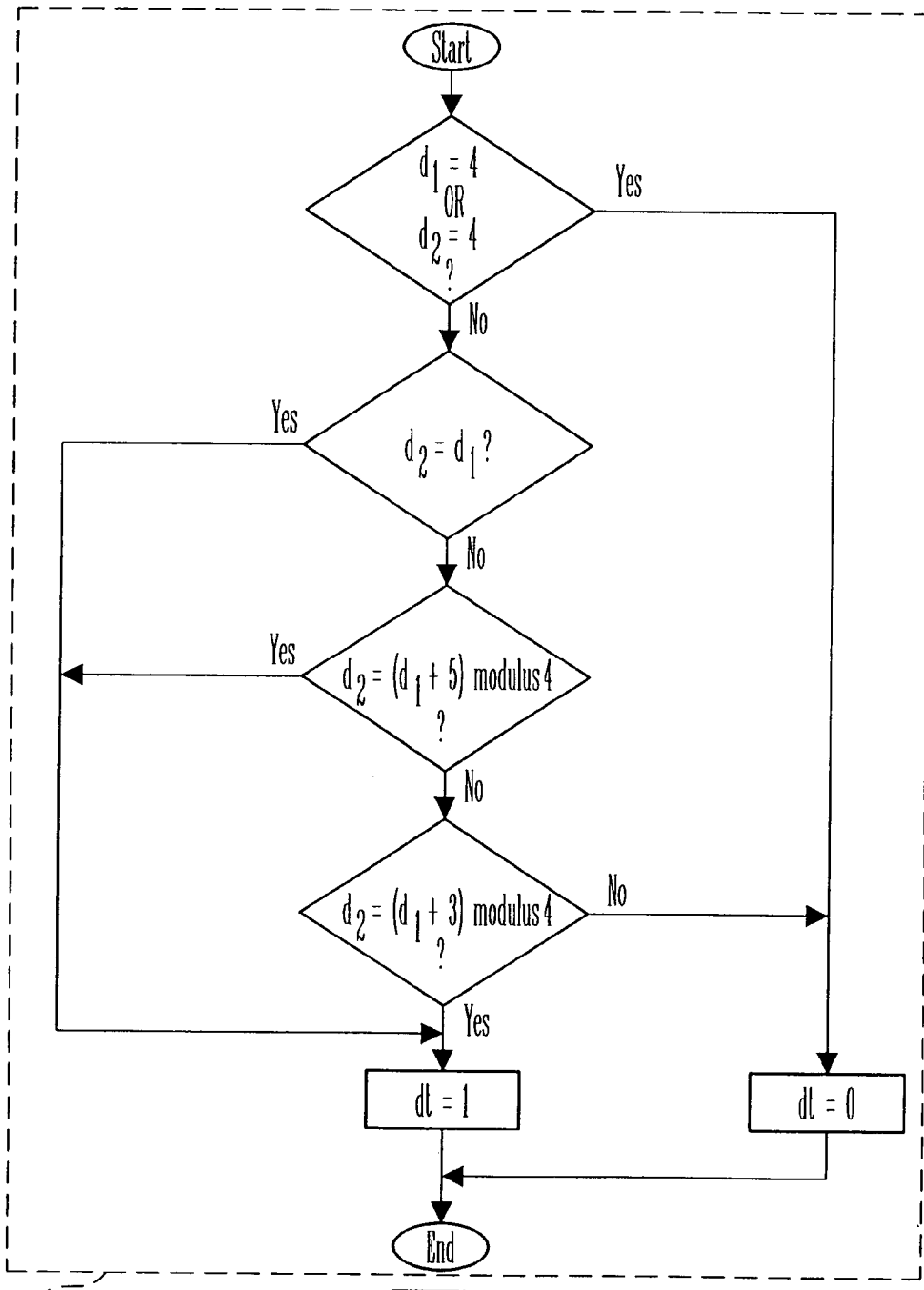
Figure 20:
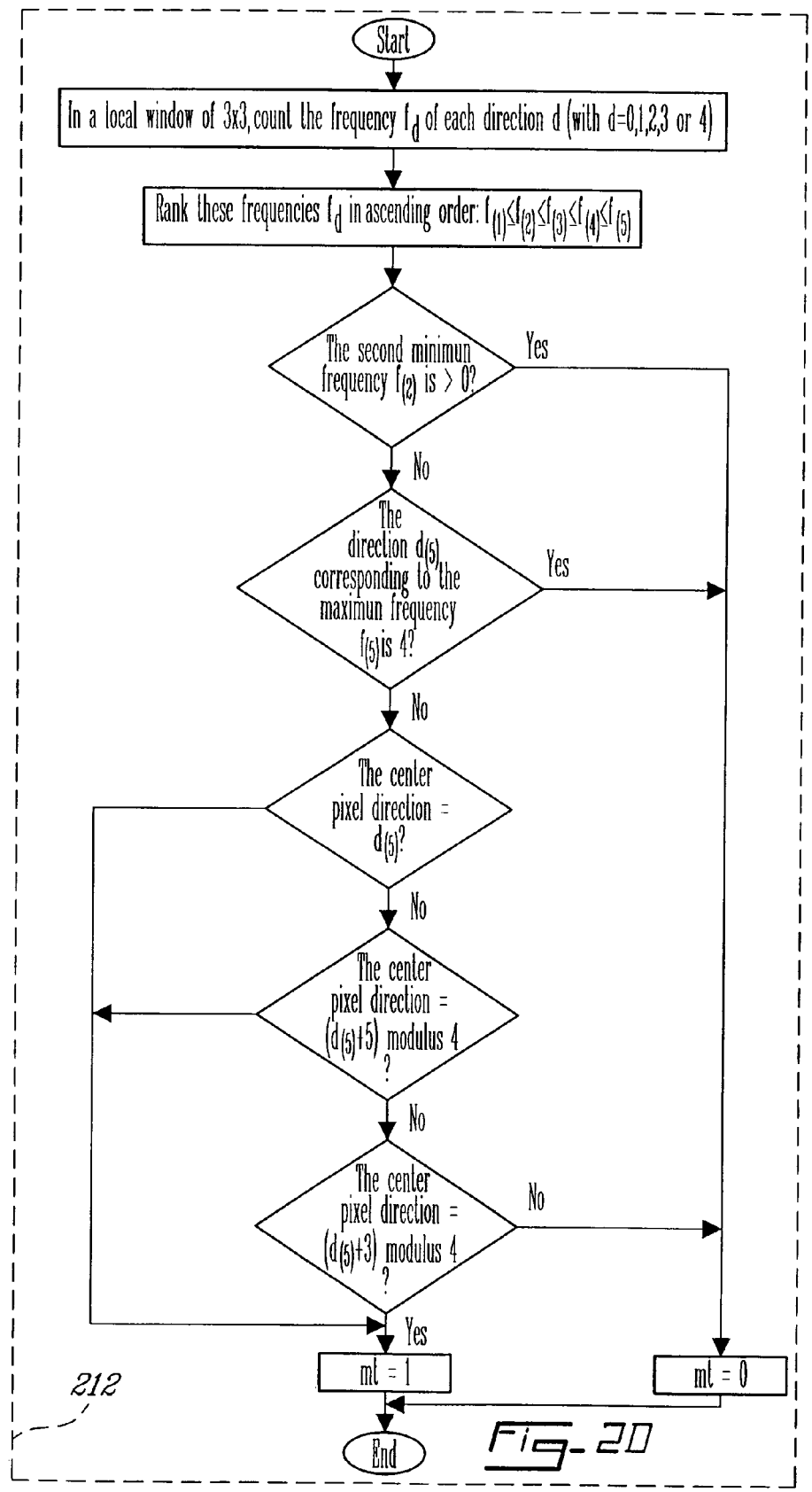

Each of these parts will now be described. Since alias and ringing distortions are located on precise regions of the image, the first step is to identify different existing regions and then assign each pixel to one of the identified regions. FIG. 2 illustrates the method and apparatus utilized to segment the input image. The segmentation process yields the four (4) following regions:

Edge (E);

Near-Edge (NE);

Texture (T);

Flat (F);

This method is based on the utilization of four (4) directional gradient operators 202, 203, 204 and 205 which correspond to, respectively, the horizontal Sobel, the diagonal +45° Sobel, the vertical Sobel and the diagonal −45° Sobel. The input signal 100 is first applied to LP filter 201 whose impulse response is also illustrated in FIG. 2a. Output 230 of this filter is then applied to the Sobel operators 202 to 205. Outputs 231 to 234 of these operators are respectively calculated according to the following equations:

$$S_0 = |2\cdot(A_1 - A_{-1}) + (B_1 + C_1 - B_{-1} - C_{-1})| \text{ for output 231}$$

$$S_1 = |2\cdot(C_1 - C_{-1}) + (D_1 + A_1 - A_{-1} D_{-1})| \text{ for output 232}$$

$$S_2 = |2\cdot(D_1 - D_{-1}) + (C_1 + B_{-1} B_1 - C_{-1})| \text{ for output 233}$$

$$S_3 = |2\cdot(B_{-1} - B_1) + (A_{-1} + D_1 - A_1 - D_{-1})| \text{ for output 234}$$

where:

$A\pm 1$, $B\pm 1$, $C\pm 1$ and $D\pm 1$ are pixel values located around the pixel X as illustrated in FIG. 2b and whose derivative value is to be determined.

Outputs 231 to 234 are then compared to a threshold value of 24 through comparators 206 to 208. These comparators deliver outputs 235 to 238, respectively, which take the same value as their respective input if this last one is superior or equal to the threshold of 24; otherwise they are set to zero (0). Outputs 235 to 238 are applied in turn simultaneously to the direction detection system 210 and the maximum pixel-based selection system 211. The direction detection system 210 allows for obtaining two possible directions d1 at 240 and d2 at 241 for a particular pixel. Direction detections d1 at 240 and d2 at 241 are made by determining directions associated to the biggest value, for d1, and the second biggest value, for d2, among signals 235 to 238. Thus d1 at 240 and d2 at 241 can have the following values:

$d_1 = 0$ (for direction 0°) if the first maximum value is $S_0$ at 235

= 1 (for direction +45°) if the first maximum value is $S_1$ at 236

= 2 (for direction 90°) if the first maximum value is $S_2$ at 237

= 3 (for direction −45°) if the first maximum value is $S_3$ at 238 and $d_2 = 0$ (for direction 0°) if the 2nd maximum value is $S_0$ at 235

= 1 (for direction +45°) if the 2nd maximum value is $S_1$ at 236

= 2 (for direction 90°) if the 2nd maximum value is $S_2$ at 237

= 3 (for direction −45°) if the 2nd maximum value is $S_3$ at 238

$d_1$ and $d_2$ can also take the value four (4) which indicates a directional invalidity. This happens when:

$$|M_1 - M_2| < 2.0 \text{ and } |M_2 - M_3| < 2.0$$

where $M_1$, $M_2$, $M_3$ are respectively the first, second and third maximum gradient values.

From these two directions $d_1$ at 240 and $d_2$ at 241, two tests, namely the Multiple directional test (MD Test) at numeral 212 and the Directional Compatibility test (DC Test) at numeral 213, are performed in order to validate the values that were found for $d_1$ and $d_2$. The algorithm for the DC Test at 213 is described in detail in FIG. 2c and the one for MD Test at 212 is detailed in FIG. 2d. Unit 212 does the test by using direction symbols surrounding the centre pixel whose direction is $d_1$ at 240. Thus, in a local window of 3×3 pixel centered on the pixel to be tested, counting of frequency for each direction symbol is made and then, a sorting is conducted in order to determine the dominating direction symbol $d_{(5)}$. The two (2) first validation conditions are that the number of direction symbols within the local window must not exceed three (3), i.e. the frequency f(2) corresponding to the second minimum must be null (0), and the dominating direction symbol d(5) must be a valid direction, that means $d(5) \neq 4$; otherwise, the test states an incompatibility at this pixel. In cases where the two (2) conditions are observed, an ultimate condition is to test whether the centre direction symbol d1 is the dominating direction symbol, i.e. d1=d(5), or it is adjacent to the dominating direction symbol, i.e. $d1 = \{(d_{(5)} \pm 1) \text{ modulus } 4\}$. In such a case, the test decides a compatibility state for the centre pixel; otherwise, an incompatibility state is output. Unit 213 uses direction symbols $d_1$ at 240 and $d_2$ at 241 estimated for the centre pixel, to decide the compatibility at this pixel. If either $d_1$ or $d_2$ is equal to the incompatible direction symbol four (4), then there is not need to go further and the decision is an incompatible state. On the other hand, if the first condition is met, then a second condition is tested by verifying whether the two estimated directions $d_1$ and $d_2$ are adjacent, i.e. $d_2 = d_1$ or $d_2 = \{(d_1 \pm 1) \text{ modulus } 4\}$. In such a case, the test decides a compatibility state for the centre pixel; otherwise, an incompatibility state is output.

Units 212 and 213 deliver respectively, binary signals "mt" at 242 and "dt" at 243. These signals take a value OFF (0) whenever the tests are incompatible and ON (1) whenever they are compatible. The particular pixel is declared directionally compatible if both test outputs "mt" at 242 and "dt" at 243 are compatible. The NAND gate 214 gathers these two tests outputs 242 and 243, and its output 244 takes either the ON (1) or the OFF (0) value. In the first case, the particular pixel is declared directionally incompatible and in the second case, it is declared directionally compatible. To avoid any isolated decision, two binary filters 215 and 216 are used to remove and to insert binary pixels to the decision map 244. The binary filter 215 receives the binary signal 244 and, in a local 2D window of 3×3 centered on the particular pixel 244, counts the number of ON pixels. If this number of ON pixels is inferior to the specified threshold of 3, then the output pixel 245 takes the value zero (0); otherwise, it takes the same value as the input pixel 244. The output 245 is then applied to the input of binary filter 216 which functions on a principle that is opposite to binary filter 215. This means that if the number of ON pixels, within the local 2D window of 3×3 centered on the pixel 245, is superior to the specified threshold of 6, then the output "nc" at 246 is set to ON (1); otherwise, it takes the same value as the input pixel 245.

The output signal "nc" designated at numeral 246 is the decision whether the luma input pixel 100 is a compatible edge pixel or not. If its value is set to ON (1), then the particular pixel is not an edge pixel, and vice versa.

Signals 235 to 238 are also fed to the maximum pixel-based selection unit 211. This unit enables the determination of high-frequency (HF) regions. It selects the maximal gradient value among the four (4) values 235 to 238 provided. The selected value is delivered to the output 239. This output is then compared to a threshold of 48 through the comparator 217 which delivers the output 247 that takes a value one (1) if the pixel 239 is superior or equal to the specified threshold and a value zero (0) if not. The output 247 is then provided to operators 218 and 219 which output the signal $E_p$ at 249. Operators 218 and 219 are binary filters and their functionality is the same as binary filters 216 and 215, except that the specified thresholds are respectively three (3) and four (4). The signal $E_p$ at 249 is a binary indicator of HF, this means that when it is ON (1), the input pixel 100 is a HF pixel; and vice versa. From this HF indicator 249, the distinction between edge and texture must be made. The texture identification is realized by using the AND gate 220 which delivers a binary output $T_p$ at 250, and the binary filter 223 which delivers a binary output T at 251. The binary filter 223 receives the binary signal 250 and, in a local 2D window of 5×5 centered on the particular pixel 250, counts the number of ON pixels. If this number of ON pixels is inferior to the threshold of 10, then the output pixel 251 takes the value zero (0); on the other hand, if the number of ON pixels is superior to the threshold of 16, then the output pixel 251 takes the value one (1) and otherwise it takes the same value as the input pixel 250.

The edge identification is realized by using the NOT gate 221 and the AND gate 222 which outputs the binary signal 252, as illustrated in FIG. 2a. The signal 252 is set to ON (1) if the particular pixel 100 is identified as an Edge (E) pixel and it is set to OFF (0) if not. It should be noted that if the binary HF signal 249 is set to OFF (0), then it is identified as a Flat pixel type. This is realized through the NOT gate 225 and the binary filter 226. This latter functions according to the same principle as binary filter 223, except that the inferior threshold is two (2) and the superior threshold is four (4). The output F at 254 is an indicator of Flat regions (F).

Finally, the Near-Edge (NE) indicator 256 is obtained by using units 224, 227 and 228. The binary filter 224 functions like the binary filter 216, except that the local 2D window is 5×5 and the insert threshold is set to two (2). It is used as a morphological operator here to dilate edges in order to identify regions near edges. Hence the output result $E_x$ at 253 is an enlarged edge. The NE signal at 256 is obtained by the logical equation:

$$NE = (\overline{E}) \cdot (E_x) \cdot (F)$$

where · is the AND operator.

While utilizing binary filters, it is possible for input pixel 100 to be identified as belonging to more than one region. For example, a pixel at input 100 may be identified as belonging to both edge and texture regions, that means that signals E at 251 and T at 252 are both set to ON. Therefore it is necessary to establish a priority rule in such a case. This rule is implemented through the unit Map Correction 229, according to the following priority rule:

NE>E>T>F

Figure 3:
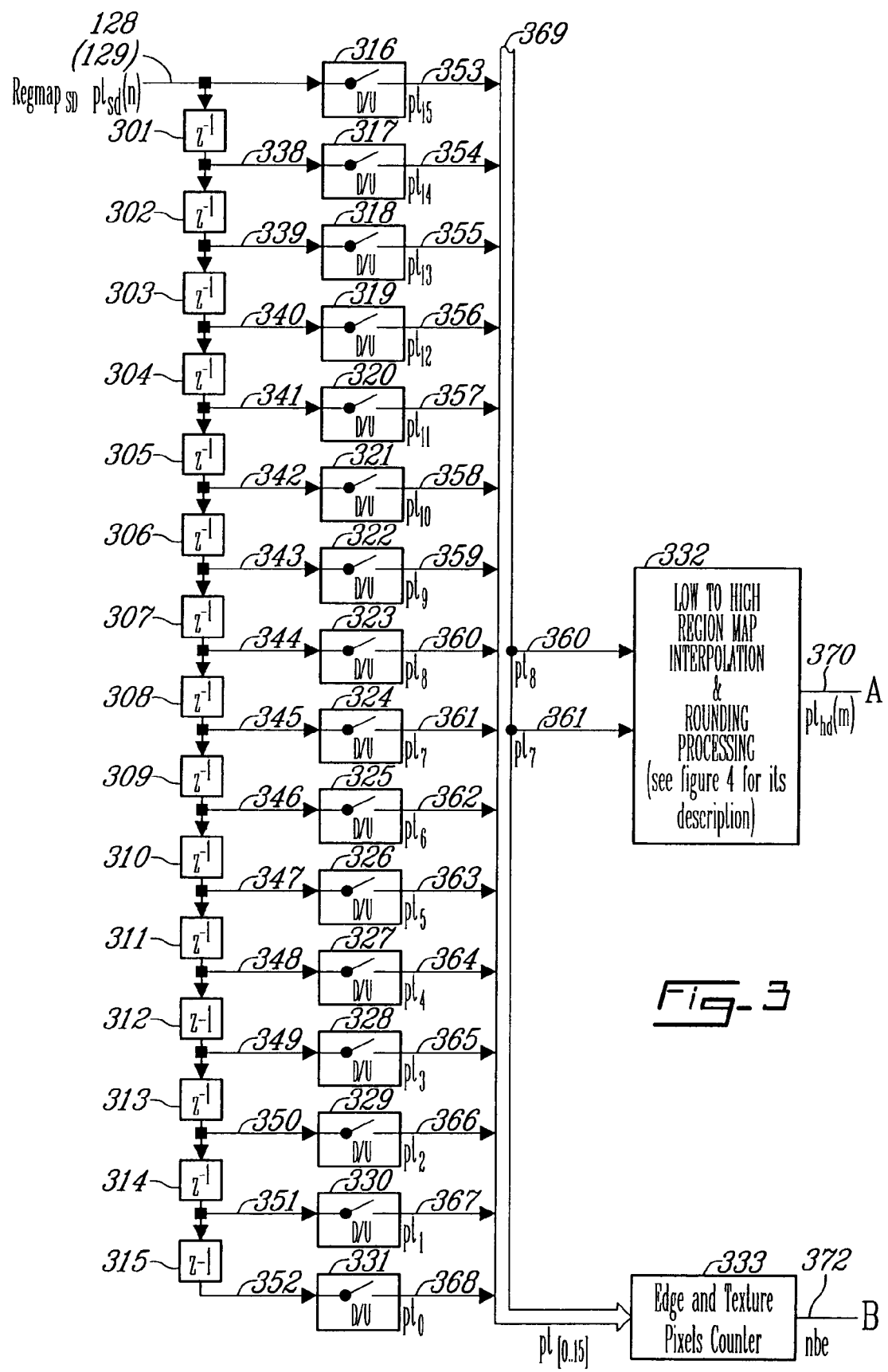
FIG. 3 is a block diagram which illustrates the method and apparatus used to resize the region map 128 (or 129), obtained from apparatus 101, to another region map 129 (or 130) that has a different size. The apparatus is referred to as number 102 (or 103) in FIG. 1.
Figure 3:
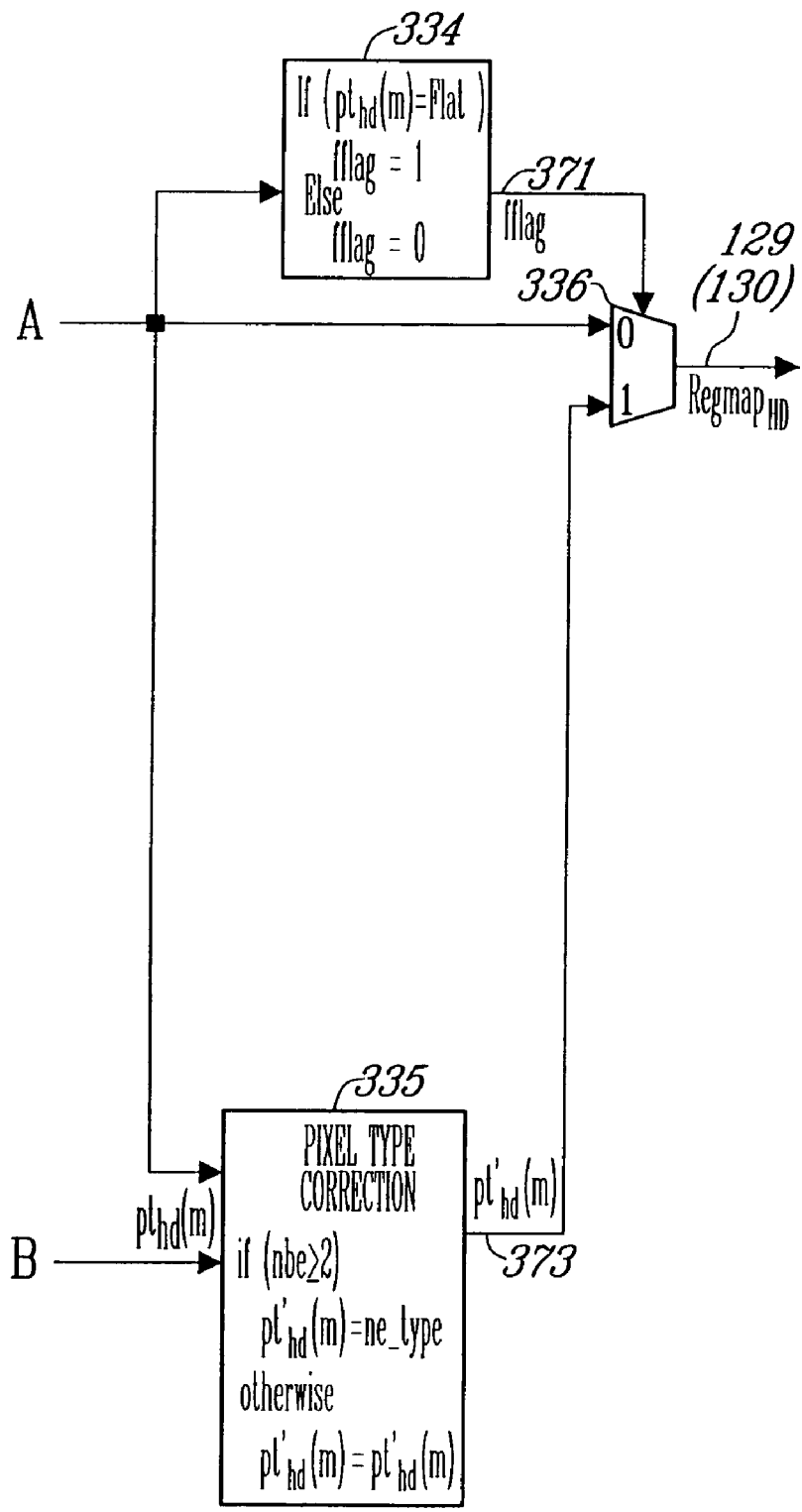

The output signal at 128 is a two (2) bits signal whose signification is:
00; Flat
01: Texture
10: Near-Edge
11: Edge One of the purposes of the present invention is the ability to choose one type of interpolation among several others, according to the type of pixel to be interpolated. Hence it is important to determine the nature of that pixel before its interpolation. This determination is made by utilizing unit 102 (FIG. 1), in the horizontal interpolation case, and unit 103, in the vertical interpolation case. These two units function similarly and details about their implementation are illustrated in FIG. 3.

Figure 4:
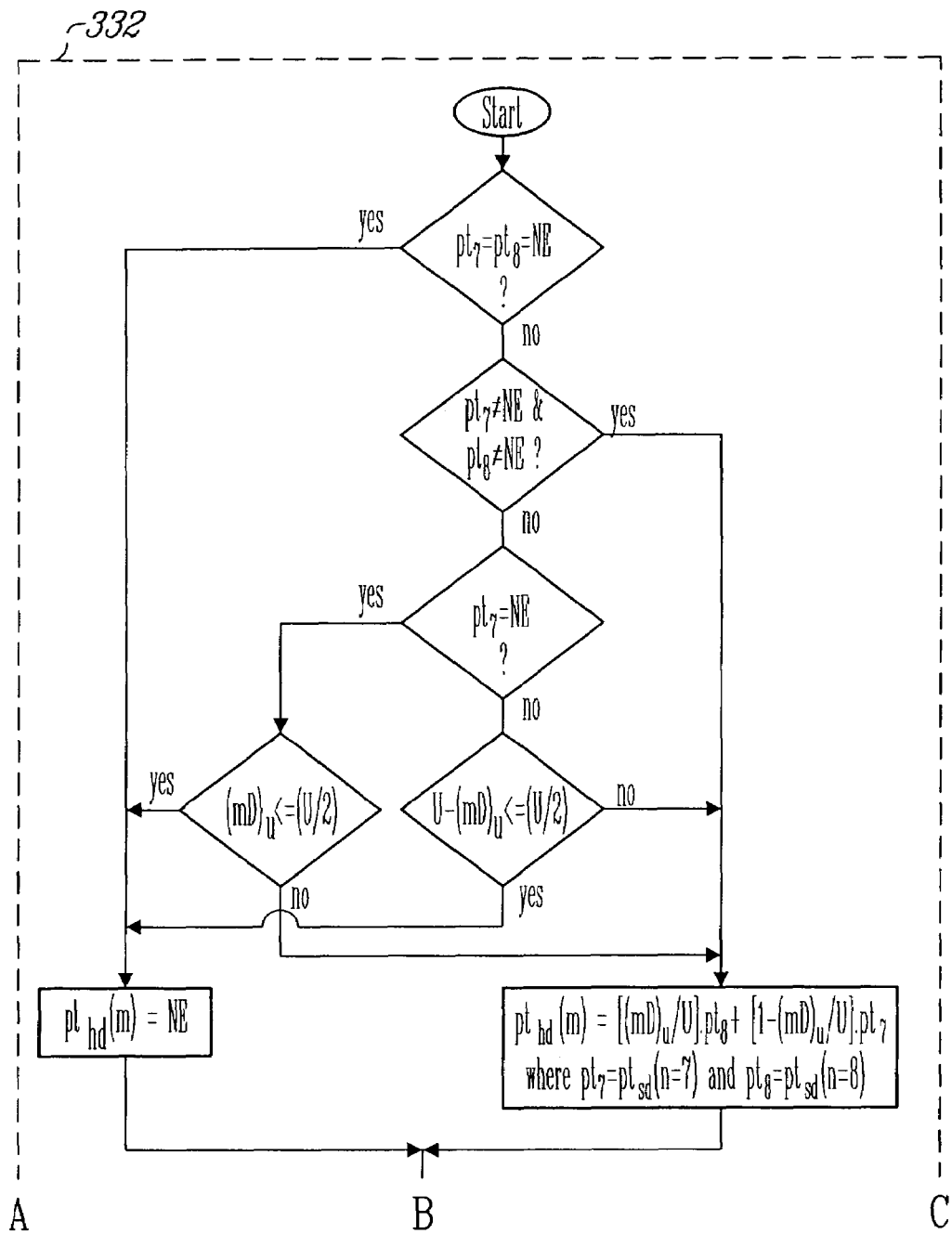
FIG. 4 is a flowchart which describes the algorithm for device 332 as referred to in FIG. 3.
Figure 4:
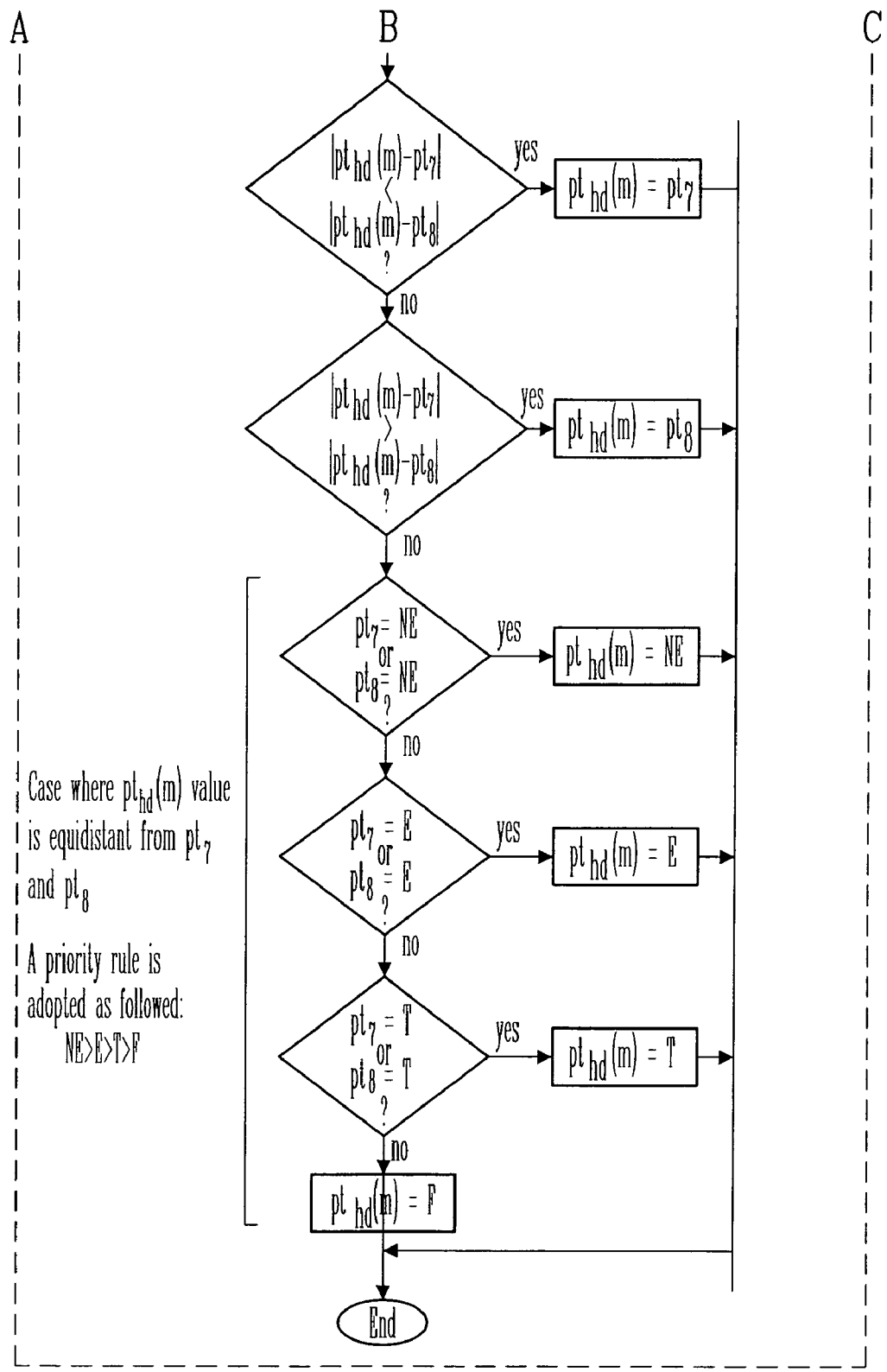

The segmentation signal 128 (or 129) is passed through a shift register operating at the frequency $F_x$ and having a maximum length of K=M/U, where M is the length of the time-invariant FIR filter and U is the maximum up conversion parameter. In the embodiment illustrated in FIG. 3, K is taken equal to 16. The shift register is identified by delay elements 301 to 315. The different stages of the register, identified by signal 128 (or 129) and 338 to 352, are connected respectively to sample and hold devices 316 to 331 which serve to couple the input sampling frequency $F_x$ to the output sampling frequency $F_y=(U/D) \cdot F_x$. Sample and Hold devices output signals 353 to 368 which are connected to the bus 369 which, in turn, supplies the processing unit 332 and the HF counter 333. The algorithm of the processing unit 332 is described in FIG. 4. This unit 332 aims at producing HD control signals from SD $pt_7$ at 360 and $pt_8$ at 361. Thus it receives as inputs, signals $pt_7$ at 360 and $pt_8$ at 361. If $pt_7$ and $pt_8$ are both NE type, then the first estimation for the HD output signal is also a NE type. Moreover, if $pt_7$ is a NE type and the distance from the concerned pixel to $pt_7$ is small enough, i.e. $(mD)_U \leq U/2$, or if $pt_8$ is a NE type and the distance from the concerned pixel to $pt_8$ is small enough, i.e. $U-(mD)_U \leq U/2$, then HD output signal is also a NE type. In other cases, the type of the concerned output HD pixel is computed with:

$$pt_{HD}(m) = [(mD)_U/U] \cdot pt_8 + [1-(mD)_U/U] \cdot pt_7$$

wherein:
$(\cdot)_U$ is the modulus U operator
m is the column or rows of the concerned HD pixel $pt_{HD}$
$(mD)_U/U$ is the weight associate to $pt_8$
$[1-(mD)_U/U]$ the weight associated to $pt_7$ Once the value $pt_{HD}$ is computed, it is necessary to identify it to one of the four (4) available types, namely NE, E, T and P. If the computed value $pt_{HD}$ is close to either $pt_7$ or $pt_8$, then it will take the same value as the one to which it is close. On the other hand, if the computed value $pt_{HD}$ is equidistant from pt7 and pt8, then a priority rule is used to decide the final value for $pt_{HD}$. This rule is as following:

NE>E>T>F where '>' indicates the precedence order; for instance, NE has precedence over E.

This unit outputs the signal $pt_{HD}(m)$ at 370 which indicates the nature of the pixel to be interpolated. Specially, if the resulting output at 370 is a Flat pixel, a correction on this result may be necessary. This correction occurs whenever there are two or more pixels of type E and/or T among pixels 353 to 368. The count is realized by the counter 333 which outputs the number "nbe" at output 372. The test and the correction are realized by unit 335 which provides the new value $pt'_{HD}(m)$ at output 373 The determination of whether or not it is necessary or not to have a correction on the pixel is realized by the unit 334 which issues a decision flag at 371. If an eventual correction is detected (flag=1), then output $pt'_o(m)$ at 373 is conveyed towards output 129 (or 130) of the multiplexer 336; otherwise, output 129 (or 130) take the value of $pt_{HD}(m)$ at 370. Signals generated at 129 (for the horizontal case) and 130 (for the vertical case) permit to interpolate the output pixel based on the content of the image.

The process of interpolation will now be described in detail. Since methods of interpolation for horizontal and vertical directions are identical, except for the delay elements which are pixel delays in the horizontal case and line delays in the vertical case, we will only proceed with the description for the horizontal case. The vertical case will be referred to using parenthesis in the following text. As shown in FIG. 1, the process of interpolation comprises three steps: 1) normalization of the resizing parameters "Uh" at 120 (or "Uv" at 124) and "Dh" at 121 (or "Dv" at 125); 2) selection of the useful taps from the FIR filter and 3) interpolation.

Figure 5A:
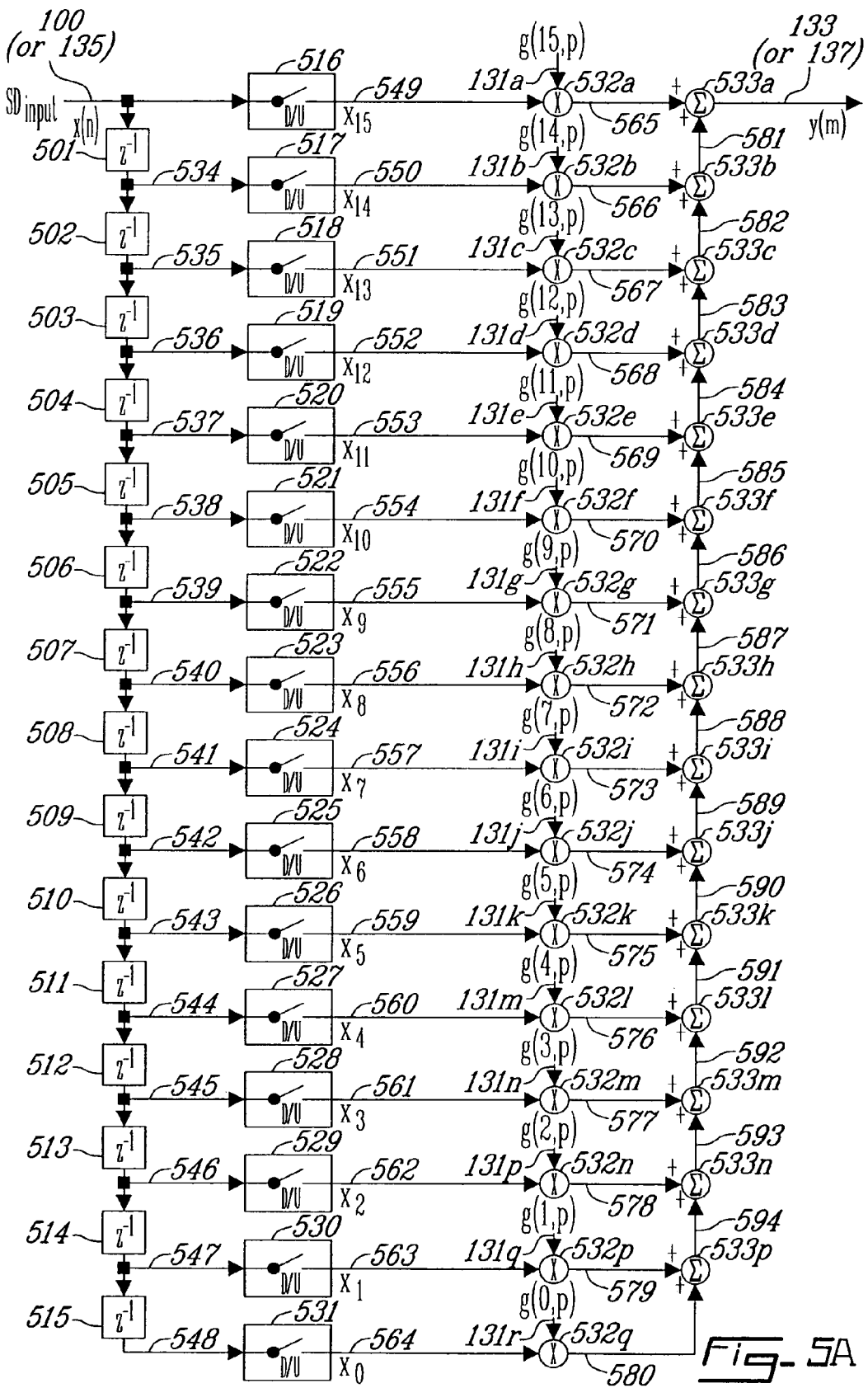
FIG. 5a is a block diagram which shows a prior art linear polyphase filters 107 and 112 as referred in FIG. 1.
Figure 5B:
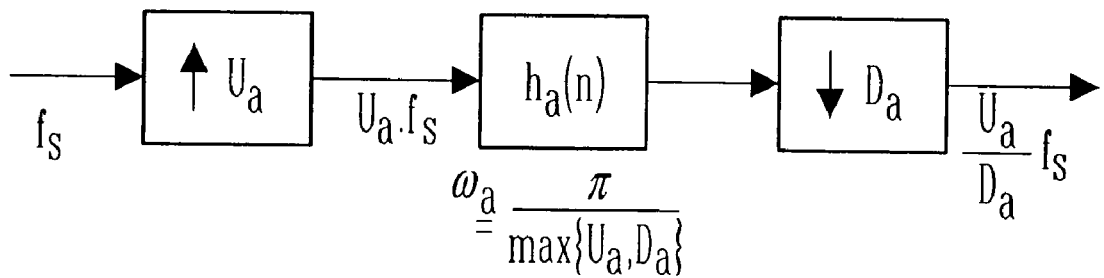
FIG. 5b-5d are block diagrams that show prior art methods used to upscale (FIG. 5c) or downscale (FIG. 5d) video signals.
Figure 5C:
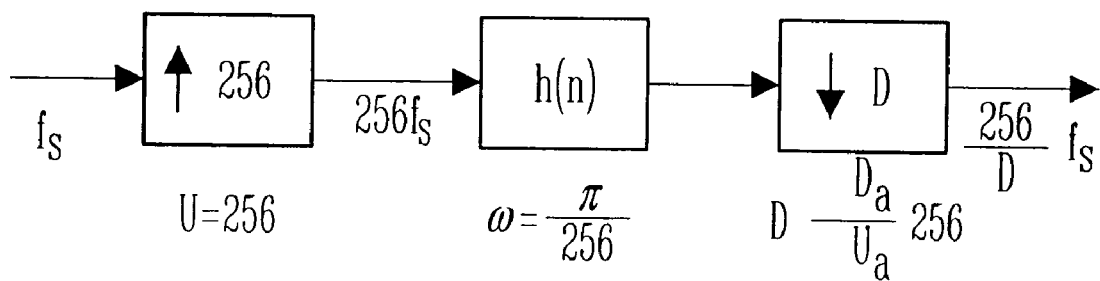
Figure 5D:
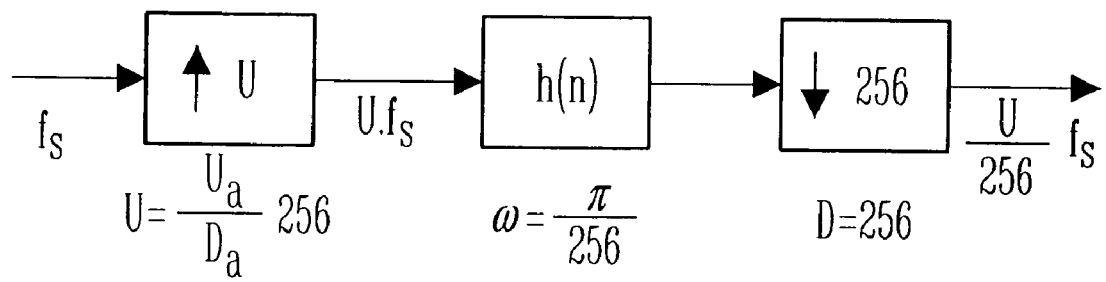

Usually, a resizing ratio of $r_a=U_a/D_a$ using a polyphase filtering process needs the design of a low-pass FIR filter $h_a(n)$ having a cutoff frequency $\omega_a=\pi/\max(U_a, D_a)$ as illustrated in FIG. 5b. For a different conversion ratio $r_b=U_b/D_b$, a different low-pass filter $h_b(n)$ must be designed. Another purpose of the present invention is to use a same FIR low-pass filter for any conversion ratio r=U/D. The idea is to transform an arbitrary conversion ratio $r_a=U_a/D_a$ to a normalized conversion ratio r=U/D. Since the cutoff frequency of the polyphase FIR low-pass filter h(n) is of the form $\omega=\pi/\max(U,D)$, we can fix this maximum to a constant p. In our illustration shown in FIG. 5c and FIG. 5d, this constant p is taken equal to 256, a constant that is assigned either to U or to D. Thus, the designed FIR low-pass filter has a cutoff frequency $\omega=\pi/256$. The normalization of the conversion ratio follows the rule stated in units 104 and 109 of FIG. 1 and replicated for convenience in FIG. 5c and FIG. 5d. The resulting normalized resizing parameters U at 122 and D at 123 (or U' at 126 and D' at 127) outputted from unit 104 (or unit 109) are used to drive the Phase Selector 105 (or 110) which also receives the FIR filter 118 (or 119). The Phase Selector 105 (or 110) subdivides the FIR filter 118 (or 119) into a set of polyphase filters, each one having a maximal number of 16 taps. These taps are provided on outputs 131a to 131q (134a to 134q) and vary periodically at the output frequency $F_y=(U/D)F_x$. These varying coefficients 131a to 131q (134a to 134q) are utilized by linear filter 107 (or 112) and non-linear filter 106 (or 111). FIG. 5a illustrates the diagram of the linear polyphase filter 112. It is based on the polyphase structure, this means that the input x(n) at numeral 100 (or 135) is injected through a shift register which, comprised of elements 501 to 515, operates at the input frequency $F_x$ and has a length of K=16. Elements 501 to 515 are pixel delays in the horizontal case and line delays in the vertical case. Output stages 100 (or 135) and 534 to 548 of this register are then connected to sample and hold devices 516 to 531 which serve to couple input frequency $F_x$ to the output frequency $F_y$. The outputs 549 to 564 of the sample and hold devices are then multiplied by filter coefficients 131*a* to 131*q* and the resulting products 565 to 580 are summed through adder 533*a* to 533*p* to yield the result y(m) at 595.

Figure 6:
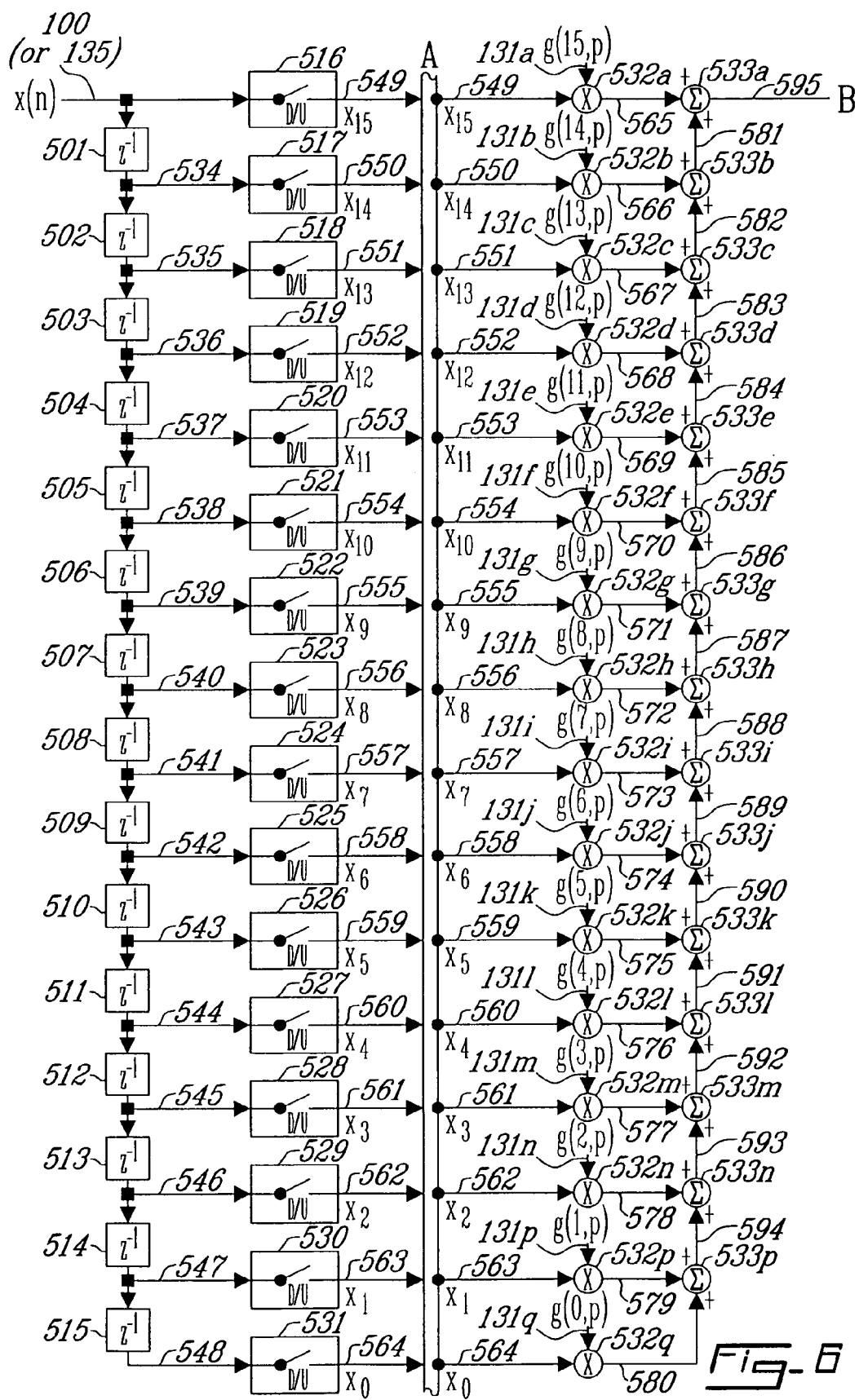
FIG. 6 is a block diagram which shows the non-linear polyphase filter 106 and 111 as referred in FIG. 1.
Figure 6:
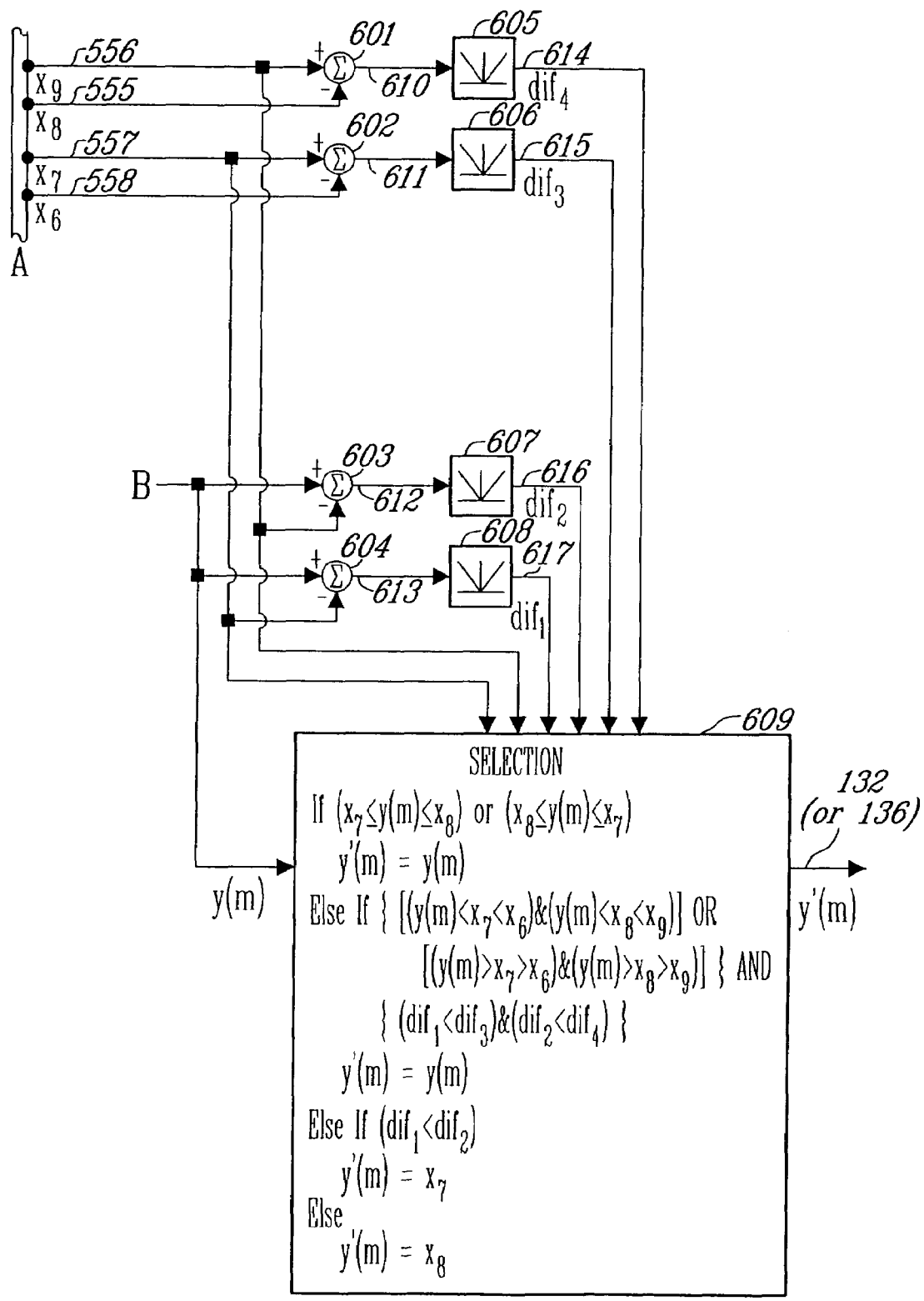

FIG. 6 illustrates the diagram of the non-linear filter of the present invention. It is based on the polyphase structure, this means that the input x(n) at numeral 100 (or 135) is injected through a shift register which, comprised of elements 501 to 515, operates at the input frequency $F_x$ and has a length of K=16. Elements 501 to 515 are pixel delays in the horizontal case and line delays in the vertical case. Output stages 100 (or 135) and 534 to 548 of this register are then connected to sample and hold devices 516 to 531 which serve to couple input frequency $F_x$ to the output frequency $F_y$. The outputs 549 to 564 of the sample and hold devices are then multiplied by filter coefficients 131*a* to 131*q* and the resulting products 565 to 580 are summed through adder 533*a* to 533*p* to yield the result y(m) at 595. The signal y(m) at 595 is then compared to input samples 555, 556, 557 and 558 by mean of the unit 609, according to the algorithm as described in device 609 of FIG. 6 wherein:

y(m)=signal at 595;

$x_6$=signal at 558;

$x_7$=signal at 557;

$x_8$=signal at 556;

$x_9$=signal at 555;

$dif_1 = |y(m)-x_7|$ calculated by using the adder 604 and the absolute operator 608;

$dif_2 = |y(m)-x_8|$ calculated by using the adder 603 and the absolute operator 607;

$dif_3 = |x_7-x_6|$ calculated by using the adder 602 and the absolute operator 606;

$dif_4 = |x_8-x_9|$ calculated by using the adder 601 and the absolute operator 605;

Referring back now to FIG. 1, the interpolation method is chosen by using the multiplexer 108 (or 113) which is controlled by signal 129 (or 130). If signal 129 (or 130) has values 00 (Flat indicator) and 01 (Texture indicator), then the simple linear filtering output y(m) at 133 (or 137) is conveyed towards output 135 (or 138). On the other hand, if signal 129 (or 130) has values 10 (Near-Edge indicator) and 11 (Edge indicator), then the non-linear filtering output y'(m) at 132 (or 136) is conveyed towards output 135 (or 138). The output 138 is the resampled (or resized or interpolated) pixel, obtained by resizing both in horizontal and vertical directions.

Figure 7A:
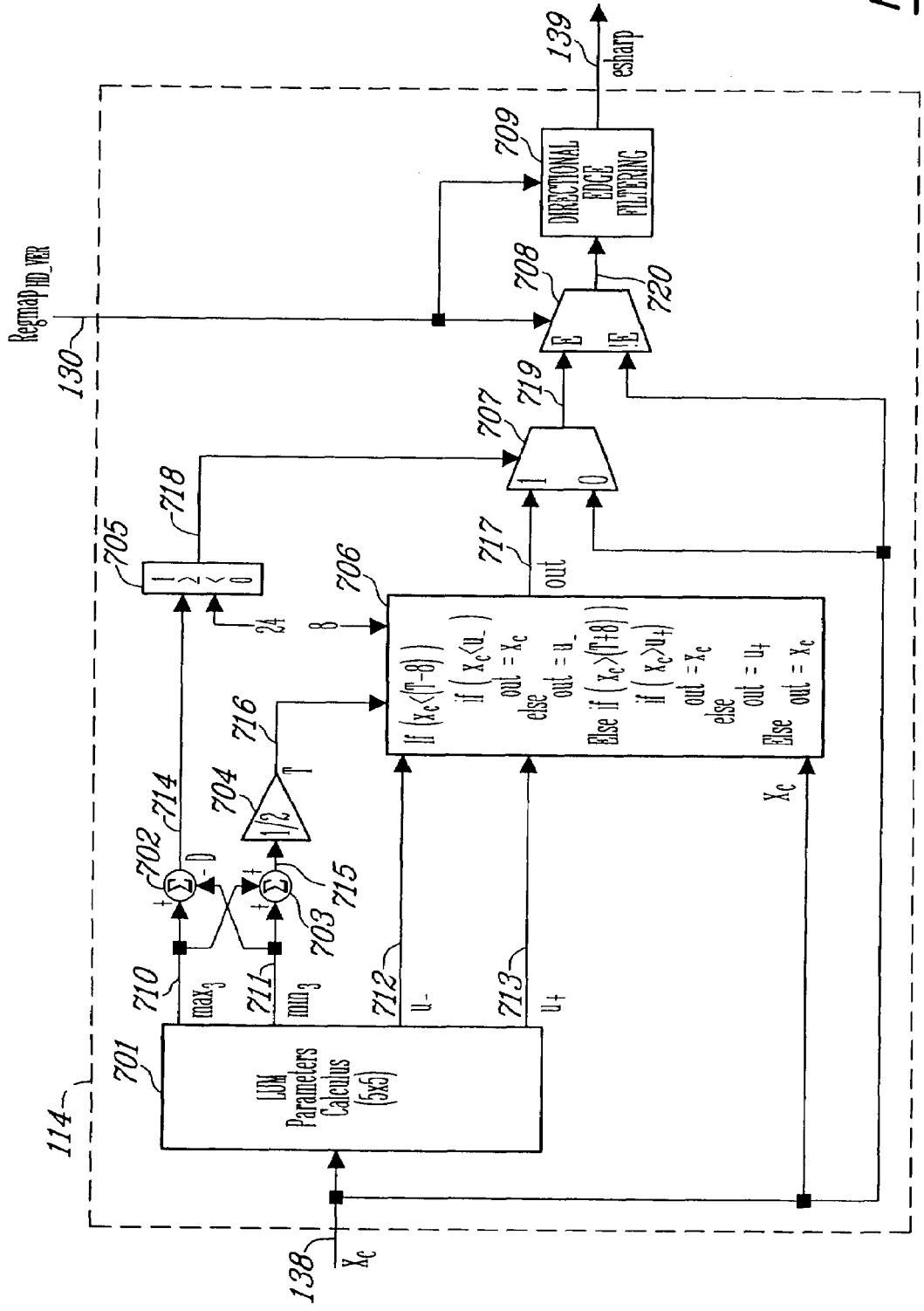
FIG. 7a is a block diagram which shows the edge sharpening module 114 as referred to in FIG. 1.

Yet another purpose of the present invention is to obtain a resized image with crisp edges and textures. This target is realized by devices 114, 115, 116 and 117. The device 114 is a non-linear sharpener and serves to enhance edge pixel type. Details on the implementation of the device 114 are illustrated in FIG. 7*a*. The signal 138 is passed through the device 701 for computing parameters $max_3$ at 710, $min_3$ at 711, $\mu_-$ at 712 and $\mu_+$ at 713. The algorithm for computing these parameters is described in FIG. 7*b*. Parameters $max_3$ at 710 and $min_3$ at 711 serve to determine parameters D at 714 and T at 716, which are obtained with the following equations:

$D = max_3 - min_3$, calculated by using subtractor 702

$T = (max_3 + min_3)/2$, calculated by using adder 703 and divisor 704

The parameter D is an indicator of high transition of the edge. Thus, it is compared to a threshold of 24 through the comparator 705 which outputs a binary signal 718. The latter takes the value one (1) if signal D at 714 is superior or equal to the specified threshold, and zero (0) otherwise. As to the parameter T at 716, it is used as a dynamic threshold for device 706 which also receives parameters $\mu_-$ at 712 and $\mu_+$ at 713. The device 706 calculates output 717 according to the following equation:

$$x_c = \begin{cases} \mu_-, & \text{if } [x_c < (T-8) \ \& \ x_c \geq \mu_-] \\ \mu_+, & \text{if } [x_c > (T+8) \ \& \ x_c \leq \mu_+] \\ x_c, & \text{otherwise} \end{cases}$$

Figure 7C:
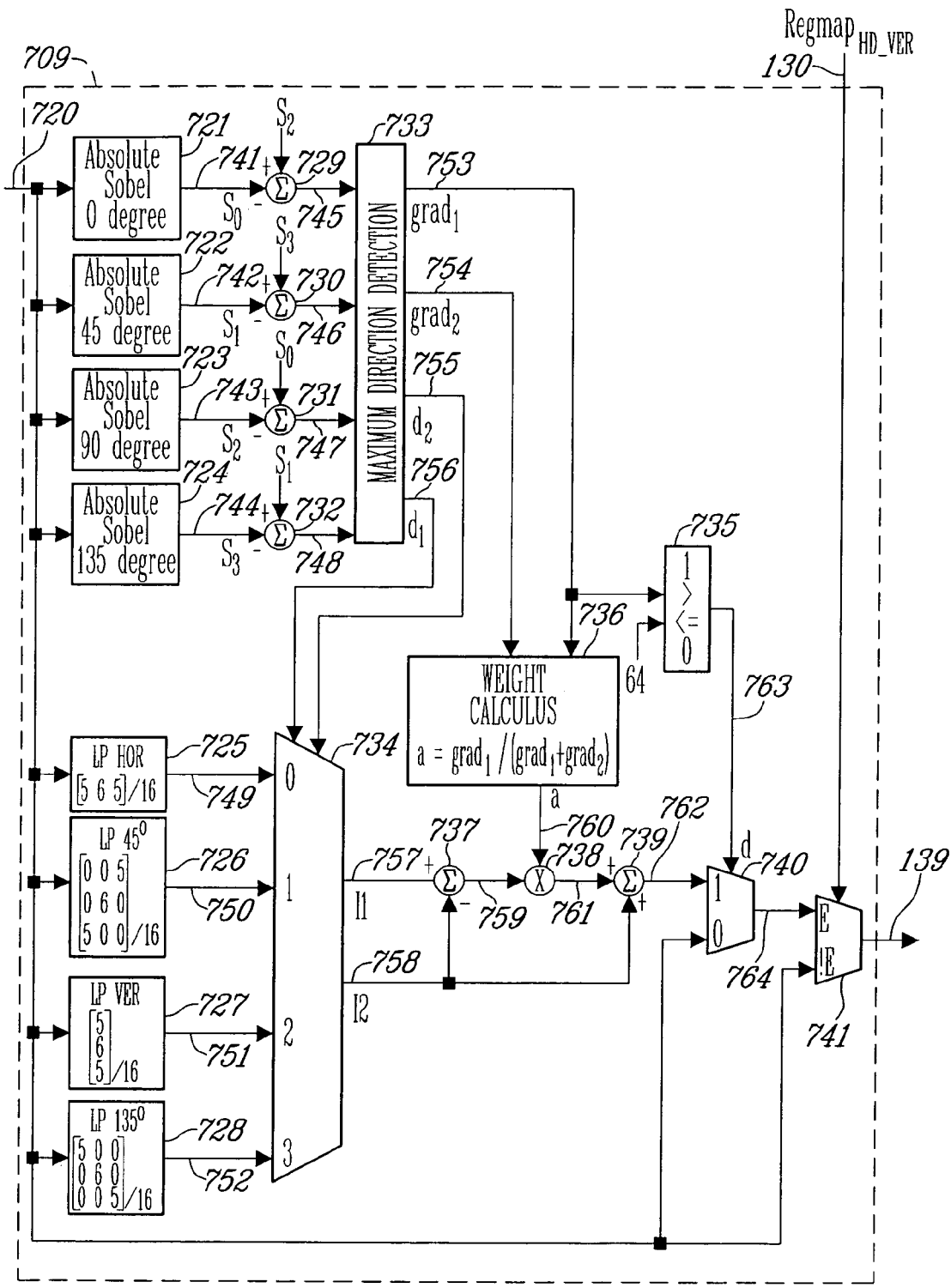
FIG. 7c is a block diagram which provides a detailed description of the Directional Edge Filtering 709.

The signal 718 controls multiplexer 707 which receives signals 717 and 138 at its inputs. When signal 718 takes the value of one (1), i.e. D≧24, then input 717 is conveyed towards the output 719 of the multiplexer. On the other hand, if signal 718 has a value zero (0), output 719 will take the value of input 138. If the input 138 is an edge pixel type (indicated by signal 130), then signal 719 is conveyed to the output 720 of the multiplexer 708; otherwise, the value of signal 138 is assigned to the output 720. The output signal 720 is then filtered by the directional adaptive filter 709 whose details are described in FIG. 7*c*.

Filter 709 is composed of a set of four (4) low-pass filters 725 to 728 steered respectively towards 0°, +45°, 90° and −45° and a control part based on four (4) Sobel operators 721 to 724 steered, respectively, towards the same directions as low-pass filters 725 to 728. The description of these operators is the same as the one for operators 202 to 205 (of FIG. 2*a*). Each of the Sobel outputs 741 to 742 is then subtracted from the Sobel output whose direction is perpendicular to it in order to obtain a more precise gradient value corresponding to the corresponding to direction. For example, Sobel output 741 (0°) is subtracted from Sobel output 743 (90°). These subtractions are made by using subtractors 729 to 732 which yield, respectively, outputs 745 to 748. These latter are then fed into the maximum direction detection 733 which functions on the same principle as the device 210 (of FIG. 2*a*), except that here, both maximum gradient values 753 and 754 corresponding respectively to directions $d_1$ at 755 and $d_2$ at 756, are outputted. Directions $d_1$ at 755 and $d_2$ at 756 permit the selection, through the multiplexer 734, of two (2) filtered signals 757 and 758 among the four (4) directional low-pass outputs 749 to 752. Filtered signals 757 and 758 are then weighted and combined to form the output 762 according to the following equation:

$$out = a \cdot I_1 + (1-a) \cdot I_2$$

wherein:

out is the signal present at 762

$I_1$ is the signal present at 757

$I_2$ is the signal present at 758 a is the weight associated to $I_1$ and computed by device 736; and (1−a) is the weight associated to $I_2$.

Output 762 is presented to the input of the multiplexer 740 which is controlled by the binary signal 763. If this one has the value one (1), i.e. the maximum gradient 753 is greater than the threshold 64, then signal 762 is outputted to the output 764; otherwise, output 764 takes the value of the signal 720. Finally, If the input 720 is an edge pixel type (indicated by signal 130), then signal 764 is conveyed to the output 139 of the multiplexer 741; otherwise, the value of signal 720 is assigned to the output 139.

Figure 8:
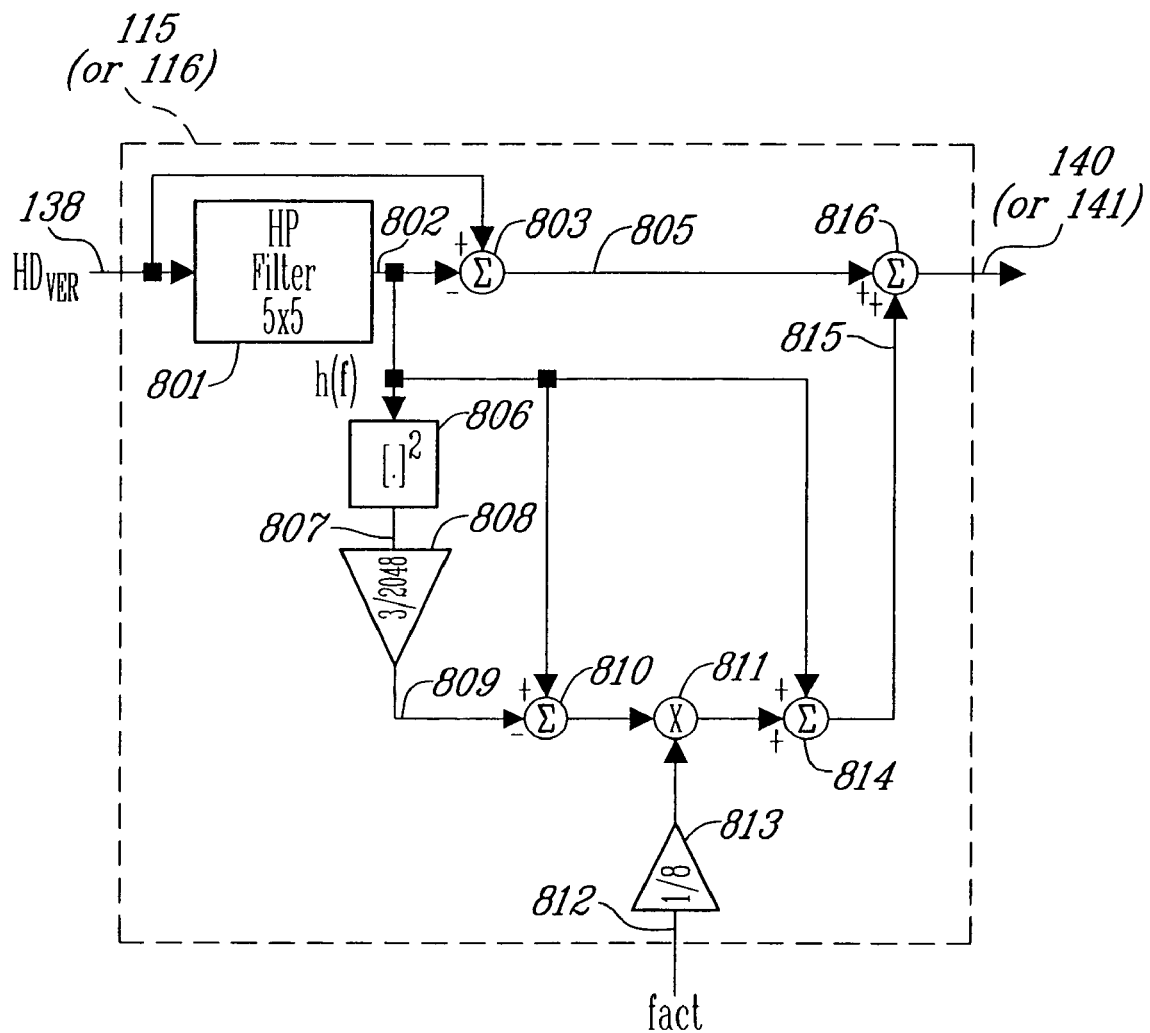
FIG. 8 is a block diagram which provides a detailed description of the Detail Enhancer 115 (or 116).

Units 115 and 116 are non-linear detail enhancer (as shown in FIG. 8) that follow the equation:

$$g = HD_{ver} + h(f) + \frac{\text{fact}}{8}\left[h(f) - \frac{3}{2048}h^2(f)\right]$$

where:
g is the output of the detail enhancer. In FIG. 1, g can be either the signal "nesharp" (signal 140) or the signal "tsharp" (signal 141)
$HD_{ver}$ is the input signal at 138
h(f) (signal 802) is the high-frequency part of input signal $Hd_{ver}$ at 138. It is obtained by filtering signal 138 with the High-Pass filter 801 whose impulse response is:

$$HP = \begin{bmatrix} 0 & 0 & -1 & 0 & 0 \\ 0 & -2 & 0 & -2 & 0 \\ -1 & 0 & 12 & 0 & -1 \\ 0 & -2 & 0 & -2 & 0 \\ 0 & 0 & -1 & 0 & 0 \end{bmatrix} / 16$$

$h^2(f)$ (signal 807) models the non-linearity part of the high-frequency h(f)
fact (signal 812) is the enhancement factor and it is controlled by users This unit enhance only the linear part of the high-frequency spectrum, thus minimizing ringing artefacts.

While illustrated in the block diagrams as groups of discrete components communicating with each other via distinct data signal connections, it will be understood by those skilled in the art that the embodiments described herein are provided by a combination of hardware and software components, with some components being implemented by a given function or operation of a hardware or software system, and many of the data paths illustrated being implemented by data communication within a computer application or operating system. The structure illustrated is thus provided for efficiency of teaching the embodiments described herein.

It should be noted that the present invention can be carried out as a method, can be embodied in a system, a computer readable medium or an electrical or electro-magnetic signal.

The embodiment(s) of the invention described above is (are) intended to be exemplary only. The scope of the invention is therefore intended to be limited solely by the scope of the appended claims.

What is claimed is:

1. A method for resizing an input image having input pixels, said method comprising:
   segmenting said input image into region types by assigning one of said region types to each one of said input pixels; and
   interpolating said input image according to the region type assigned to each one of said input pixels to produce a resized image having interpolated pixels and wherein said region types are defined using a frequency value for said input pixels and a direction value for said input pixels;
   further wherein said region types comprise an Edge (E) region type, a Near-Edge (NE) region type, a Texture (T) region type and a Flat (F) region type;
   further wherein said interpolating comprises hardware logic for non-linear polyphase filtering pixels assigned to at least one of Edge and Near-Edge region types and linear polyphase filtering pixels assigned to at least one of Texture (T) and Flat (F) region types.

2. The method of claim 1, wherein said interpolating further comprises selecting coefficients from a FIR filter for use in said polyphase filtering.

3. The method of claim 2, wherein said FIR filter comprises a FIR low-pass filter having a fixed cutoff frequency.

4. The method of claim 3, wherein a resizing ratio is defined by the size of the input image relative to the size of the resized image, and further wherein said interpolating further comprises using said resizing ratio for subdividing said FIR low-pass filter coefficients into polyphase filter coefficients used for said polyphase filtering.

5. The method of claim 3, wherein a resizing ratio is defined by the relationship U/D, where U is the upscale resizing parameter and D is the downscale resizing parameter, and further wherein said interpolating further comprises using said U and said D for subdividing said FIR low-pass filter coefficients into polyphase filter coefficients used for said polyphase filtering.

6. The method of claim 5, wherein said interpolating further comprises normalizing said U and said D.

7. The method of claim 6, wherein said fixed cutoff frequency equals .pi./256 and said normalizing is performed according to the following mile: if U>D, then U=256 and D=NI[D*256/U], else D=256 and U=NI[U*256/D], where NI is the nearest integer.

8. The method of claim 1, wherein said image comprises a horizontal dimension and a vertical dimension and further wherein said interpolating comprises interpolating in at least one of the horizontal and the vertical dimensions.

9. The method of claim 8, wherein said interpolating further comprises assigning one of said region types to said interpolated pixels, and the method further comprising at least one of a) non-linearly sharpening said interpolated pixels of said Edge region type, and b) non-linearly enhancing details of interpolated pixels of at least one of Near-Edge and Texture region types.

10. An apparatus for resizing an input image having input pixels, said apparatus comprising: a segmentation unit for segmenting said input image into region types by assigning one of said region types to each one of said input pixels; an interpolating unit comprising a polyphase filter for filtering said input pixels according to the region type assigned to each one of said input pixels to produce a resized image having interpolated pixels and wherein said region types are defined using a frequency value for said input pixels and a direction value for said input pixels; and a FIR low-pass filter having a fixed cutoff frequency having FIR filter coefficients; and wherein said interpolating unit further comprises a phase selector for selecting at least some of said FIR filter coefficients for use in said polyphase filtering; further wherein a resizing ratio is defined by the relationship U/D, where U is the upscale resizing parameter and D is the downscale resizing parameter, and further wherein said interpolating unit is further using said U and said D for subdividing said FIR low-pass filter coefficients into polyphase filter coefficients used for said polyphase filtering.

11. The apparatus of claim 10, wherein said interpolating unit further comprises a normalizing unit for normalizing said U and said D.

12. The apparatus of claim 11, wherein said fixed cutoff frequency equals .pi./256 and said normalizing is performed according to the following rule: if U>D, then U=256 and D=NI[D*256/U], else D=256 and U=NI[U*256/D], where NI is the nearest integer.

13. The apparatus of claim 12, wherein said region types comprise an Edge (E) region type and a Near-Edge (NE) region type, and further wherein said polyphase filter comprises a non-linear polyphase filter for non-linearly filtering pixels assigned to at least one of Edge and Near-Edge region types.

14. The apparatus of claim 13, wherein said region types further comprise a Texture (T) region type and a Flat (F) region type, and further wherein said polyphase filter comprises linear polyphase filter for linearly filtering pixels assigned to at least one of Texture and Flat region types.

15. The apparatus of claim 14, wherein said image comprises a horizontal dimension and a vertical dimension and further wherein said interpolating unit comprises at least one of a horizontal interpolating unit for interpolating in the horizontal dimension and a vertical interpolating unit for interpolating in the vertical dimension.

16. The apparatus of claim 15, wherein said interpolating unit if further for assigning one of said region types to said interpolated pixels, and the apparatus further comprising at least one of a) a non-linear sharpener for sharpening said interpolated pixels of said Edge region type, b) a first non-linear enhancer for enhancing details of interpolated pixels of said Near-Edge region type, and c) a second non-linear enhancer for enhancing details of interpolated pixels of said Texture region type.

* * * * *